Dec. 27, 1966　　　　H. J. TOGASHI ETAL　　　　3,293,766
FREEZE DRIED PRODUCT AND METHOD
Filed April 19, 1965　　　　　　　　　　　　　　3 Sheets-Sheet 1

INVENTORS
Hachiro J. Togashi
James L. Mercer

Merriam, Smith & Marshall
ATTORNEY

Dec. 27, 1966   H. J. TOGASHI ETAL   3,293,766
FREEZE DRIED PRODUCT AND METHOD
Filed April 19, 1965                               3 Sheets-Sheet 2

Fig 2

INVENTORS
Hachiro J. Togashi
James L. Mercer
BY Merriam, Smith & Marshall
ATTORNEY

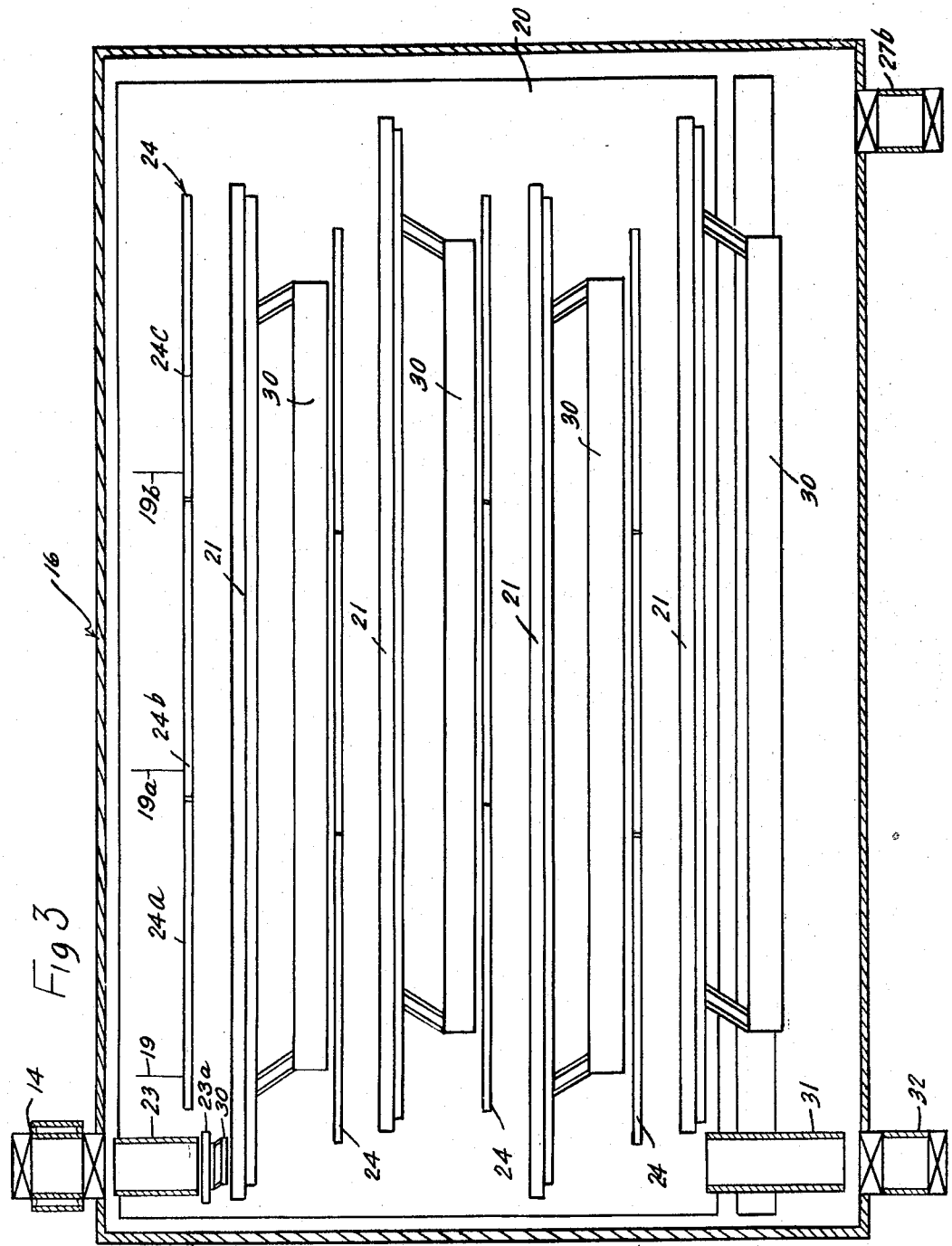

United States Patent Office 3,293,766
Patented Dec. 27, 1966

3,293,766
FREEZE DRIED PRODUCT AND METHOD
Hachiro J. Togashi, Chicago, and James L. Mercer, Arlington Heights, Ill., assignors to Cryo-Maid, Inc., West Palatine, Ill., a corporation of Delaware
Filed Apr. 19, 1965, Ser. No. 450,260
12 Claims. (Cl. 34—5)

This application is a continuation-in-part of our copending application Serial No. 263,284, filed March 6, 1963, now abandoned, which is a continuation-in-part of our copending application Serial No. 220,328, filed August 29, 1962, now abandoned, which in turn is a continuation-in-part of our application Serial No. 185,978, filed April 9, 1962, now abandoned.

This invention relates to new freeze dried products and a method and apparatus for preparing the same, and more particularly, to a novel dry particulate composition comprising the water-soluble principles of roasted coffee beans.

The drying of perishable materials in the frozen state is well known. Up to the present time, however, no rapid freeze drying process has been available.

One important factor which has been a deterrent to rapid freeze drying is that of supplying the heat necessary for converting the water (ice) to vapor without overheating any portion of the product. If the drying is carried on very slowly, this is not a problem, but the more rapidly the process is operated, the greater the necessary heat input and the greater the concentration of heat energy on the surface of the drying product. If one were dealing with only a single molecule of the ultimate dry product surrounded by molecules of water, this might not be a serious problem. In a particle of any practical size, however, the outer portions of the particle will dry first, sending the ice line in toward the center. All of the subsequent heat required to cause the ice in the interior of the particle to sublime must be supplied through the increasingly thick dried portion of the particle. It has thus been characteristic that past efforts to speed up the process by supplying heat at a high rate have resulted in scorching or overheating of the outer portions of the particle. In most cases, this overheating caused and obvious deterioration in the quality of the product, but even if it did not, it resulted in a non-homogeneous particle, the outer portions of which have been altered with respect to the inner portions.

Among the other problems encountered in freeze drying processes is the necessity for handling large volumes of vapors. Instead of an increase in volume of about 1700 to 1 which is characteristic of the change from liquid water to steam at atmospheric pressure, at the low pressures used in freeze drying, the volumetric ratio usually runs into the millions or even hundreds of millions. The large equipment required for handling these large volumes of vapor represents a large capital investment relative to the amount of product which can be processed.

In order to minimize the size of equipment necessary to permit handling the large quantities of vapor which are evolved when frozen materials are dried at commercially significant rates, the prior art has attempted to maximize the flow velocity of the vapor in its travel from the zone where it is evolved to the pumps which remove it from the system. At any given rate of water vapor evolution, it is obviously true that the size of conduit or flow path required to remove it from the system varies inversely with the velocity with which the vapor travels in the conduit. If a high rate of vapor velocity is achieved, the conduit can be smaller and, therefore, less costly than if a lower velocity is used.

As a result of these factors, freeze drying has heretofore been commercially practical only for the slow processing of expensive materials, for which the processing cost was a relatively small percentage of the total cost.

It has now been discovered that rapid and economical drying of products containing a large percentage of water, e.g., 50% or more, can be accomplished by means of the process of the invention, in which the product to be dried is first solidly frozen, preferably as quickly as possible, ground or shredded (if the product is not already in the form of discrete particles) to relatively uniformly sized pieces or particles while frozen, and subjected in the frozen condition to the action of a dehydrating zone in which the water is caused to be sublimed from the frozen particles at low temperature and pressure.

Contrary to the efforts of the prior art, we have found that, surprisingly, the overall rate of production of dried products can be vastly increased without deterioration in quality by deliberately limiting the vapor velocity to only a small fraction of the maximum theoretical. Specifically, we have found that the vapor velocity should not exceed about 20% of the arithmetical average molecular velocity for the vapor under the conditions which exist in the flow path. We have further found that, when the flow velocity drops below 3% of the arithmetical average molecular velocity, no further advantage occurs, so that there is no reason for using a velocity below 3%.

The dehydrating zone used in accordance with the invention is characterized by the following features:

(1) A condensing surface (cryoplate) at very low temperature is provided immediately adjacent the product being dried without intervening serious restrictions to the flow of water vapor, thus preventing the build-up of water vapor molecules at any point within the zone.

The flow path of water vapor from the point where it is evolved from the product being dried to the cryoplate condenser should be such that at no point in the travel of the vapor does the average flow velocity exceed 20% of the arithmetical average molecular velocity at the existent conditions. It is preferred that the flow velocity exceed 3% of the arithmetical average molecular velocity, since no advantage is gained by going below this figure.

(2) The efficiency of the process is demonstrated by the fact that the average dynamic water load, i.e., the average rate at which the water vapor is evolved from a unit area of the drying surface or product pathway during the drying cycle is at least 0.25 lb./hr. ft.$^2$ for all products and may exceed about 0.4 lb./hr. ft.$^2$ if the material being dried exists in the form of pieces having a size smaller than about 4 mesh. Moreover, this high drying rate is achieved without adverse effect on the quality of the product, such as scorching or case hardening.

(3) Energy for supplying the heat of sublimation is preferably provided to the particles in the form of radiant energy, a substantial portion thereof, suitably at least about 50% and preferably about 80%, having a wavelength longer than about 2.5 microns. Although radiant energy is preferred, other methods of supplying heat to the particles, such as conductive heating and dielectric or microwave heating, may also be used.

(4) The frozen particles are agitated or vibrated or otherwise acted on so as to change the orientation of the surface of the particles. Thus, each particle presents a substantially constantly changing portion of its surface for absorbing energy from the energy source, thereby preventing localized hot spots while still permitting a high rate of energy absorption. In the preferred continuous embodiment of the process, the vibrations can also be used to advance the particles along a pathway through the dehydration system. The vibration and depth of the layer are correlated so that for practical purposes, each particle is in free communication with the energy source and the condenser. That is, shielding of one particle by others is largely avoided.

(5) At least about 20% of the area of the product pathway is cooled by external means to a temperature below about 32° F. This cooling unexpectedly improves product quality while preventing sticking and agglomeration.

(6) The temperature of the particles is maintained at all times sufficiently low that the particles are not permitted to thaw in any part (including those particles in contact with the pathway along which the particles move). Thawing of the particles is prevented by maintaining the pressure in the zone sufficiently low that the refrigerating effect caused by the sublimation of the ice crystals in the particles serves to keep them solidly frozen.

The invention will be better understood from the following detailed description thereof, taken in conjunction with the accompanying drawings, in which the same numbers are used to refer to corresponding items, and in which:

FIGURE 2 is a front elevation of the dehydrating chamber, in partial section to show the interior thereof; and FIGURE 3 is a side view of the chamber of FIGURE 2, also in partial section to show the interior.

Figure 1:
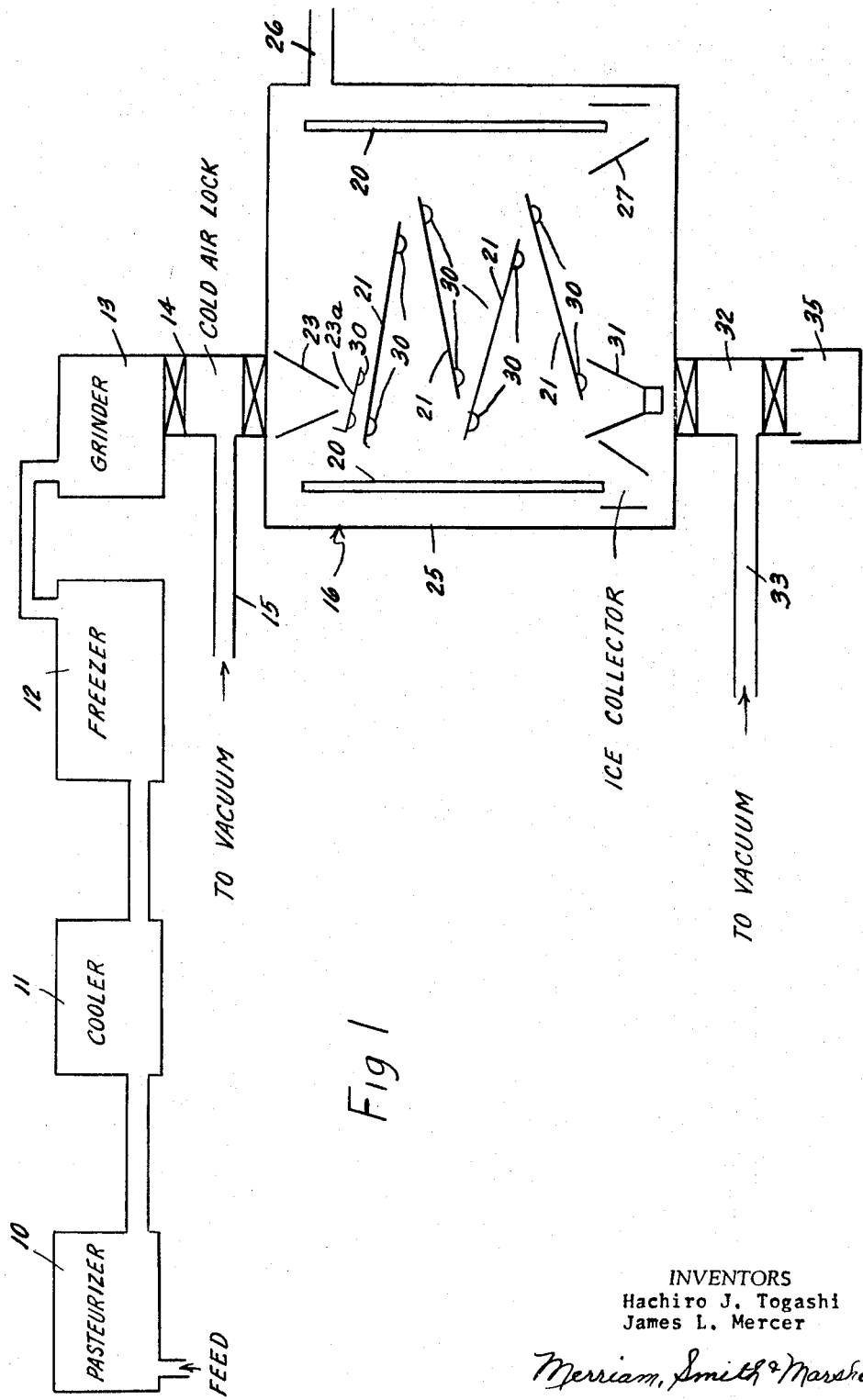
FIGURE 1 is a diagrammatic flow sheet of the process.

As shown in FIGURE 1, the product, if it is a liquid, such as orange juice, coffee beverage, grapefruit juice, tomato juice, etc., may be introduced, if required by the nature of the product, to pasteurizer 10 where it is heated to the desired pasteurizing temperature, which, of course, may be different for different products. It is then passed to pre-cooler 11 where it is cooled almost to the freezing point, and then to freezer 12 where it is quickly frozen, usually to a temperature on the order of +15° F. to −20° F. or lower, depending on the material.

For use in the process, the product must exist in the form of discrete pieces or particles. If the product does not naturally exist in this form, it is comminuted or ground, e.g., by refrigerated grinder 13 (which may have 1 or more stages), under conditions which will not substantially raise its temperature and which will preferably produce particles of a uniform size. With products for which the particle size in the reconstituted state is unimportant, e.g., liquids or semi-solids, such as coffee and tomato paste, the frozen material is ground to a relatively fine mesh size in order to increase the surface area available for sublimation of ice. At the same time, it has been found that the particles are preferably not extremely fine because of a tendency to become entrained (and lost) in the stream of water vapor flowing to the cryoplate condensers. A satisfactory size range for many products has been found to be about 4 to 16 mesh, which is fine enough to permit rapid drying without undue entrainment. Solids such as blueberries, chicken meat, and shrimp are frozen and then shreaded or cut if necessary to the size desired in the reconstituted product, recognizing that the coarser the particles, the longer the necessary drying time. In any event, if the particles differ widely in size, they may be screened and the larger ones further reduced in size; or the particles may be passed in different streams through the apparatus; or particles of different sizes may be inserted at different points in the process; or different apparatuses may be provided for particles of different sizes. Such modifications in the process will be apparent to those skilled in the art.

The cold particles are then passed to air lock 14 wherein all air is removed and the particles are held in a vacuum of about 400 to 800 microns until ready to be introduced to the drying system 16. A vacuum pump (not shown), preferably employing a cryoplate condenser, communicates with air lock 14 through conduit 15. At proper intervals, the material is fed from air lock 14 into hopper 23 in the drying system 16 and from there fed by a controllable vibrating feeder 23a at a regulated, preferably uniform, rate to the trays 21 situated below the hopper 23.

Referring to FIGURES 2 and 3, the drying system 16 comprises a sealed chamber 25 containing one or more stacks of trays 21 bounded on each side by cryoplates or cold walls 20. These cryoplates are maintained at a suitably low temperature, usually below about −50° F. and preferably below about −90° F., by the use of Dry Ice, mechanical refrigeration, or the use of other suitable refrigerating media such as liquid cryogens. The cryoplates function as high-speed pumps and maintain a low pressure by causing water vapor and other condensible gases to condense and freeze on the cold surface.

One or more conduits 26 are provided for connection to an evacuating system (not shown) capable of reducing the pressure within chamber 25 quickly at the beginning of the drying operation. After the device is once in operation, the vacuum system which communicates at 26 largely idles and is used only for the purpose of removing any non-condensible gases which may have found their way into the system.

In the embodiment shown, each of trays 21 is provided with one or more vibrators 30. The vibrators 30, together with the trays 21, constitute vibrating conveyors of a type known to the art. A conveyor of this type imparts a "dancing," i.e., bouncing and rotating, motion to the particles as they move along the conveyor with only minimum contact with each other. The vibrators are preferably such as to provide a wide range of frequency and/or amplitude control as necessary or desired for proper movement of the particles. In some cases, when treating products that are relatively insensitive to heat, it may be possible to stop the vibration entirely for a short period. Normally, such a cessation of vibration should not last longer than about 30 to 60 seconds.

The actual path traveled by the particles is not an important consideration in the process of the invention. The trays 21 may be horizontal as shown, or inclined upwardly or downwardly, as necessary or desirable to make most efficient use of the evacuated zone.

Means are provided for removing ice which collects on cryoplates 20. These are not illustrated since suitable means are known. Suitably, ice may be removed by passing hot material coupled to the connections 28 through the cryoplate, by heating or flexing the surface of the cryoplate itself, or by actual mechanical scraping. Baffles 27 are provided for diverting ice dislodged from cryoplates 20 and for directing it to suitable means (not shown) for removal from the system.

Each cryoplate 20 is, of course, provided with connections to a source of refrigerating medium. Only the connections 28 are indicated here.

The process of the invention is operated in a continuous manner by providing a number of individual cryoplates, each equipped with its own means for loosening the layer of ice which accumulates thereon. These cryoplates are selectively de-iced without upsetting the equilibrium of the system, the ice falling to the bottom of the chamber where it is broken (e.g., by breaker 27a) and removed from the drying zone by suitable means (not shown), such as a screw conveyor, through airlocks 27b.

The heat required for sublimation of the ice in the product is preferably supplied in the form of radiant heat. Heated plates 24 for this purpose are shown in FIGURES 2 and 3, which transmit energy downwardly onto the frozen particles on trays 21.

We have found that the wavelength of the radiant energy is an important consideration for insuring that the energy is effectively utilized to cause useful sublimation of the ice rather than mere inefficient heating of the apparatus. This can be accomplished if a substantial portion, suitably 50% and preferably at least 80%, of the radiant energy has a wavelength longer than 2.5 microns. Radiant energy of this nature is both efficient in causing sublimation of the ice and, because of its limited content of visible and ultraviolet energy, prevents bleaching of the product, a defect which is serious in most dried food products, e.g., dried tomato juice.

Radiant energy suitable for the invention is supplied theoretically by a black body heated to a temperature not higher than about 900° F. The relatively low output intensity of such a source requires that it have a relatively large area in order to radiate sufficient energy. In practice, suitable energy sources may comprise heated metal plates 24 arranged above the trays 21 on which the particles travel, the plates 24 being heated electrically to the desired operating temperature in accordance with the level set at a series of corresponding variable heat controls 17 connected to a power line 18. The plates 24 can also be heated from behind by means of quartz-enclosed hot filament (e.g., tungsten) lamps or in any other suitable manner to the desired operating temperature.

It is preferred, in the operation of the process of the invention, to program the heat input in such a manner as to maximize the overall rate of water removal from the product without adversely affecting its quality.

We have found that, in order to avoid deterioration in product quality, the temperature of the product being processed must not exceed a certain maximum temperature, which differs for different products. In the case of dried coffee beverage, for example, the temperature of the particles should not exceed about 90° F. at any time during processing. When the water (ice) content of the product is relatively high, i.e., at an initial stage of the process, the rate of heat input can also be relatively high without exceeding the maximum product temperature, since the energy supplied results only in the rapid sublimation of ice at the surface of the product without a rise in temperature which might cause deterioration of the product. As drying proceeds, however, and the ice line moves in toward the center of the particle, the surface is no longer protected against an undesirable rise in temperature by the sublimation of ice. The permissible rate of heat input accordingly cannot be as great in the later stages of the process as that at the beginning. In order to achieve a maximum overall rate of dehydration, it is, therefore, preferred to reduce the rate of energy input as the course of drying proceeds. This can be done conveniently by dividing the metal plates 24 into several individual sections, 24a, 24b, 24c, etc., (FIGURE 3), each section being provided with its own independent heat control similar to control 17 connected to respective leads 19, 19a, 19b, etc. In the typical operation of the process with such sections, the first section (i.e., 24a) would be heated to the highest temperature as set by control 17, and each succeeding section would be cooler by setting similar controls 17 coupled to corresponding leads 19, 19a or 19b, thus achieving within each section the maximum rate of heat input consistent with avoiding injury to the product.

Cooling means 29, suitably in the form of conduits or coils embedded within or attached to the under side of trays 21, are provided for cooling the trays when necessary, so that the frozen particles will not thaw and agglomerate or stick to the trays 21. We have found that cooling at least a portion of the surface area over which the material to be dried passes is essential for all products. In some cases, it is generally desirable or necessary to cool the entire surface area. Cooling of the surfaces in this manner results in the production of products having superior quality characteristics. Although the precise reason for this improvement in quality is not known, we theorize that the cooled surfaces function to help in preventing case hardening of the surface of the product, which makes further drying difficult by creating a barrier through which the evolved water vapor must flow. In order to force the water vapor to travel through this barrier, higher than desired temperatures must be achieved in the interior of the material being dried, with consequent degradation in quality.

We have found that at least 20% of the product pathway area should be cooled to a temperature not higher than about 32° F., regardless of the specific identity of the product being dried. In some cases, for example, coffee and tea beverages, it is desirable to cool at least about 50% of the tray area to temperatures between about 20° F. and −35° F., while, in still other cases, for example, in drying orange juice and tomato products, it may be found necessary to cool all of the path in order to prevent sticking and product quality deterioration.

Cooling of the trays can be achieved in any desired manner, as by supplying a circulating refrigeration medium to each of the cooling conduits 29 shown in FIGURE 2, for which the connections are not shown in the drawing.

The specific size and exact placement of the cryoplate condensers in any given case are dependent on the design of the path system. It is necessary, however, in order to achieve the efficiency of which the drying method of the invention is capable, that the conductance of the system be such that the maximum flow velocity of the water vapor which is evolved never exceeds about 20% of the arithmetical average molecular velocity under the conditions which exist in the system. As used in this context, "flow velocity" refers to the average rate with which the water vapor molecules pass through a unit cross sectional area perpendicular to the flow path, as calculated from the measured rate at which water vapor is actually removed from the zone where it is evolved.

"Flow velocity" can be calculated from the equation $$v = \frac{W}{\rho A}$$

wherein A is the cross sectional area through which the flow occurs (square feet), W is the mass flow rate of water vapor (pounds per second), $\rho$ is the density of water vapor at the temperature and pressure conditions under consideration (pounds per cubic foot). When the variables have the units described, the above equation will give the flow velocity in feet per second.

The flow velocity, calculated at any point in the system by the equation above, must be less than about 20% of the arithmetical average molecular velocity. The "arithmetical average molecular velocity," as used in this invention, is the maximum theoretical velocity of a flowing vapor and is a function only of the molecular weight of the vapor and the absolute temperature. For any gas, the arithmetical average molecular velocity can be calculated from the equation $$v_a = 354 \left(\frac{T}{M}\right)^{1/2} \text{ (ft./sec.)}$$

where M is the molecular weight of the gas and T is the absolute temperature (° R). When the vapor under consideration is water, as in the freeze drying process of the invention, the arithmetical average molecular velocity is given by the equation $$v_a = 83.3 T^{1/2} \text{ (ft./sec.)}.$$

The absolute pressure which must be maintained within the drying zone is dependent primarily on the freezing point of the product. Products with relatively high sugar contents (e.g., fruit juices) and, consequently, low freezing points will require lower pressures than other products with higher freezing points. In general, however, a pressure below about 300 microns (Hg) will be necessary, and a pressure of about 50 to 100 microns will be suitable for most products.

As the product being dried advances along the trays 21, it progresses along the pathway indicated by arrows in FIGURE 3 in a "dancing" motion imparted by the vibrators 30, so that all sides of each particle are exposed substantially uniformly to the heating medium. The rate of passage through the drying zone is correlated to the heating and cooling means so that, by the time the product reaches the end of the drying zone, it is thoroughly dried. The product is collected in hopper 31, from which it passes through a second air lock 32, which may or may not be refrigerated, to receiver 35 (FIGURE 1). A vacuum connection 33 is provided for evacuating air lock 32.

In order to illustrate the invention, a number of food products were dehydrated in a pilot size unit. The test plant included a vacuum vessel about 6 feet long, 2 feet wide, and 3 feet high, equipped with a mechanical vacuum pump capable of evacuating the chamber to a pressure of about 7 microns in 10 minutes. The chamber was equipped with cryoplates on its long opposite sides, the cryoplates having a total effective condensing area of about 24 square feet. These cryoplates were cooled to temperatures as low as about −100° F. by circulating cold brine system. The pathway for the product had an area of about 13 square feet and consisted of about 20 feet of trays about 8 inches wide, equipped with cooling coils and mounted on conventional feeder vibrators which permitted substantially uniform forward movement and agitation of the product over the 20 foot length. Mounted parallel to the trays along the length of the pathway, with enough spacing (about 2¾ inches) above the trays to allow the necessary conductance and the low flow velocity of water vapor that is necessary in accordance with the invention, were quartz-sheathed infrared heaters enclosed in flat stainless steel jackets about 6 inches wide. The heaters were grouped in 12 individual heating zones of approximately equal size, each capable of being independently controlled. The infrared heaters were used to heat the stainless steel jackets to the desired operating temperature, while the heated jackets, in turn, reradiated energy of the proper wavelength to the product being dried.

The data are summarized in the following table which shows the treatment of various food products. The heat program for each of the 12 heating zones is given, as well as the time required for drying the product to a moisture content of about 5% or less, as shown. The temperatures given for the heating zone were those of the steel jackets used to radiate heat to the product.

In each case, the flow velocity was calculated for the first one-quarter of the system, in which about 75% of the total water is removed from the product and in which the rate of vapor evolution and flow velocity have maximum values. The flow area for this section of the system was about 1.1 square feet. The calculated arithmetical average molecular velocity was not less than about 1700 ft./sec.

TABLE

| Run No. | | Percent Solids | Chamber Pressure (Microns of Hg) | Cryoplate Temp. (° F.) | Tray Temp. (° F.) | Particle Size |
|---|---|---|---|---|---|---|
| X-40 | Coffee Extract | 27.1 | 250 | −60 | −18 | 84 wt. percent, 6-16 mesh, 16 wt. percent, −16 mesh. |
| X-35 | Tea Extract | 41.2 | 74 | −100 | −19 | 84 wt. percent, 6-16 mesh, 16 wt. percent, −16 mesh. |
| X-34 | ___do___ | 42.7 | 48 | −100 | −18 | 84 wt. percent, 6-16 mesh, 16 wt. percent, −16 mesh. |
| X-46 | Tomato Paste | 25 | 115 | −100 | −19 | 2 wt. percent, +4 mesh, 65 wt. percent, 6-16 mesh, 33 wt. percent, −16 mesh. |
| X-144 | Tomato Soup | 16.75 | 170 | −85 | −35 | 2 wt. percent, +4 mesh, 65 wt. percent, 6-16 mesh, 33 wt. percent, −16 mesh. |
| X-65 | Ground Beef | 25.3 | 150 | −10 | −10 | Spherical approx. 3/16" D. |
| X-120 | Diced Ham | 40 | 150 | 0 | 0 | ¼" dice. |
| X-145 | Tomato Juice | 6.5 | 150 | −35 | −35 | 6-16 mesh. |
| X-199 | Cream of Chicken Soup | 10.0 | 295 | −10 | −10 | 6-16 mesh. |

| Run No. | Heat Program (° F.) Heating Zones | | | | | | | | | | | |
|---|---|---|---|---|---|---|---|---|---|---|---|---|
| | #1 | #2 | #3 | #4 | #5 | #6 | #7 | #8 | #9 | #10 | #11 | #12 |
| X-40 | 560 | 615 | 625 | 560 | 520 | 490 | 460 | 450 | 450 | 330 | 330 | 390 |
| X-35 | 645 | 505 | 515 | 450 | 400 | 375 | 350 | 375 | 380 | 420 | 290 | 320 |
| X-34 | 625 | 495 | 490 | 450 | 405 | 375 | 365 | 395 | 500 | 325 | 310 | 425 |
| X-46 | 630 | 540 | 480 | 460 | 430 | 420 | 405 | 405 | 420 | 350 | 420 | 400 |
| X-144 | 525 | 510 | 490 | 500 | 500 | 450 | 420 | 420 | 550 | 490 | 450 | 410 |
| X-65 | 530 | 490 | 465 | 465 | 430 | 410 | 410 | 375 | 455 | 410 | 380 | 360 |
| X-120 | 560 | 490 | 445 | 450 | 415 | 420 | 420 | 419 | 420 | 390 | 355 | 315 |
| X-145 | 560 | 540 | 460 | 480 | 470 | 440 | 450 | 460 | 560 | 470 | 415 | 385 |
| X-199 | 560 | 540 | 450 | 480 | 480 | 460 | 460 | 400 | 500 | 410 | 365 | 355 |

| Run No. | Drying Time (Min.) | Moisture Content (Percent H₂O) | Dynamic Tray Loading (lb./hr. ft.²) | Dynamic Water Loading (lb./hr. ft.²) | Flow Velocity (ft./sec.) | Arithmetical Av. Mol. Vel.,[1] ft./sec. |
|---|---|---|---|---|---|---|
| X-40 | 36 | 1.8 | 0.64 | 0.467 | 68 | 1,730 |
| X-35 | 43 | 5.0 | 0.67 | 0.394 | 196 | 1,700 |
| X-34 | 50 | 2.3 | 0.54 | 0.314 | 248 | 1,700 |
| X-46 | 39 | 2.3 | 0.54 | 0.405 | 129 | 1,710 |
| X-144 | 47 | 3.0 | 0.51 | 0.422 | 91 | 1,720 |
| X-65 | 69 | 2.8 | 0.61 | 0.455 | 100 | 1,720 |
| X-120 | 98.5 | 2.3 | 0.41 | 0.246 | 60 | 1,720 |
| X-145 | 51 | 2.0 | 0.395 | 0.370 | 90 | 1,720 |
| X-199 | 58.5 | 2.0 | 0.463 | 0.417 | 52 | 1,740 |

[1] Calculated at the temperature at which the vapor pressure of ice is equal to the chamber pressure.

It will be noted from the above table that, in general, the heat programs involved a maximum temperature in the first heating zone and gradual reduction of temperature to a minimum in the last zone. In most cases, the program included a zone which was operated at a temperature lower than those on either side of it. This is not a necessary feature of the process, but, rather, an operating technique found to be expedient with this particular apparatus. These isolated relatively low temperature zones were used in order to give the product, which was rather strongly heated immediately previously, an opportunity to cool off somewhat before being subjected to additional heating. Whether or not such a technique is of value in other installations depends on the particular design and construction of the unit.

The method of the invention can be used to dry practically any material having a particle size of about 4 mesh or smaller to a moisture content of about 4% or less, within about 90 minutes or less. Some materials, for example, coffee extract having not more than about 40% solids, can be dried to a final moisture content of not more than about 4% in 30 minutes or less, while maintaining a dynamic water loading of at least about 0.6 lb./hr. ft.$^2$, with no impairment of product quality. Because of this rapid drying, as well as the uniformity of the drying achieved while avoiding overheating, the products obtainable will reconstitute very rapidly on the addition of water and have a taste and overall quality entirely different from and superior to that of previous freeze dried materials of these types. The product is also not stratified as is the case where drying is from only one or two surfaces; i.e., where it is dried in a sheet, as shown in Sanders U.S. Patent No. 2,853,796. Such products shrink in one plane and are stretched in both other planes. Shrinkage is from front to back, and the product is held crosswise and lengthwise, and either crumbles to destroy the sheet or is distorted.

We have found that the process of the invention produces a dry, granular, "instant" coffee having a combination of properties heretofore unavailable in a product of this type. The dry coffee so made has a form which resembles that of ground coffee, i.e., relatively large particles, having a porous, friable nature. More significantly, however, the product, when reconstituted in the usual manner, has a flavor which reflects to a higher degree than heretofore possible the flavor of the coffee extract from which the dry product was made.

The dry coffee product of the invention is characterized by having a moisture content generally less than 3% and a surface area of at least about 7 m.$^2$/g. We have found that the surface area of the coffee of the invention is an important characteristic which distinguishes this product from other instant coffees heretofore made. Although the specific reasons for the superiority of flavor of this product are not definitely known, our product, with its large surface area, has enhanced flavor properties.

In any process in which a liquid coffee extract containing a high percentage, e.g., 50 to 80% or more, of water is reduced to a dry condition, the removal of water is brought about by the application of heat to cause the water to vaporize. The flavor constituents of coffee beverage are known to contain many organic compounds, such as esters, aldehydes, and ketones, some of which have boiling points below that of water. It would be expected, therefore, that any treatment of the coffee product leading to the removal of water would, of necessity, remove many or most of these flavor constituents. That this is apparently true is evident from the fact that the dry coffee products heretofore available have not accurately reflected the flavor characteristics of the coffee extracts from which they are made. The large surface area of our product provides considerably more opportunity for adsorption of these flavor constituents on the surface of the particles. The flavor constituents are selectively adsorbed on the surfaces in preference to the water contained in the product. As a result, the product continues to retain most of its initial flavor constituents even though the bulk of the water has been removed.

In order to demonstrate the relatively great surface area possessed by the coffee product of the invention, surface area measurements were made on a number of heretofore known dry coffee products for comparison with that of the product of the invention. In these tests, measurements were made of dry coffee compositions prepared in the following manner:

A. A coffee extract containing 20% solids was frozen to a solid sheet which was then dried under a bell jar at a pressure of about 20 microns for a period of about 12 to 13 hours. The dried sheet so produced was then broken into particles for testing.

B. The same extract used for product A above was frozen and ground in the frozen state to a particle size of about 8 to 20 mesh and then dried in a bell jar under a pressure of about 20 microns for a period of about 12 to 13 hours.

C. This product was a commercially available spray-dried "instant" coffee, typical of the products of this type which are sold to the public.

D. As representative of the product of the invention, a coffee extract having about 20% solids was dried in a continuous manner following the process of the invention. The conditions used in the process were approximately those set forth in Run 1 in the table, supra.

The surface area of each of the above products was measured, using the B.E.T. Method (see "Scientific Foundations of Vacuum Technique," by Saul Dushman, John Wiley & Sons, Inc., 1962, pp. 395–400) with the following results:

| Product: | Surface area, m.$^2$/g. |
|---|---|
| A | 1.4 |
| B | 3.15 |
| C | 2.55 |
| D | 7.5 |

It is apparent from the above figures that the product of the invention had a specific surface area more than twice as large as that of any of the other products. In addition, when reconstituted with hot water in the usual manner, the product of the invention showed, to a significantly greater degree, the typical flavor characteristics of freshly brewed coffee, with the absence of any burnt or otherwise off-flavored characteristics. The aroma of the brew was also significantly truer to that of freshly brewed coffee than were the aromas of any of the other products.

The appearance of the product of the invention constitutes another novel aspect. The product comprises particles having, in general, the size and approximate color characteristics of roasted coffee beans as ground for use in a percolator. In a preferred embodiment, at least 50% by weight of the product consists of particles having a size of about 4 to 16 mesh.

The particles of the product have a porous cellular interior, making them quite light in weight and quickly soluble in hot water. While friable, the particles are relatively tough compared to those of products A and B above and are not so readily reducible to powder under pressure. Accordingly, the product of the invention can be handled and shipped in commerce without particle breakdown. For this reason, the ease of measuring uniform quantities of the product, as by a teaspoon, is enhanced, compared to a product which might exist as a mixture of relatively coarse particles and a fine powder produced from attrition in handling and transportation.

The foregoing detailed description has been given for clearness of understanding only, and no unnecessary limitations should be understood therefrom, as modifications will be obvious to those skilled in the art.

What is claimed is:

1. A continuous method of drying a frozen, water-laden, heat-sensitive material in the form of discrete individual pieces which comprises advancing the frozen material along a pathway in an evacuated substantially air-free system in proximity to a cryoplate condenser while supplying radiant energy to said particles to cause sublimation of the ice crystals contained therein to water vapor, at least about 20% of the area of said pathway being cooled to a temperature below about 32° F.; flowing said water vapor to said cryoplate condenser, the flow path through which said water vapor flows to said condenser being such that the maximum flow velocity of the flowing vapor does not exceed about 20% of the arithmetic average molecular velocity of the vapor at the conditions which exist in said flow path; and condensing said water vapor on said cryoplate condenser; the pressure in said system being maintained sufficiently low to prevent thawing in any part of said particles; said material being advanced along said pathway in a manner such that the individual pieces present changing surfaces for the absorption of said radiant energy; the average dynamic water load for said pathway being at least about 0.25 lb./hr. ft.$^2$.

2. The method of claim 1 wherein said material is in the form of pieces having sizes smaller than about 4 mesh, and the dynamic water load for said pathway is at least about 0.4 lb./hr. ft.$^2$.

3. The method of claim 1 wherein at least about 50% of the area of said pathway is cooled to a temperature within the range from about 20° F. to about −35° F.

4. The method of claim 1 wherein at least about 50% of said radiant energy has a wavelength longer than about 2.5 microns.

5. The method of claim 1 wherein the pressure in said system is maintained below about 300 microns and at least about 80% of said radiant energy has a wavelength longer than about 2.5 microns.

6. The method of claim 1 in which the rate at which said radiant energy is supplied to said material varies progressively along said pathway, being greatest at the beginning of said pathway where the water content of said material is greatest and diminishing as the water content of said material decreases.

7. The method of claim 1 wherein said frozen material is coffee extract having not more than about 40% by weight of solids, the time required to dry said material to a moisture content below about 4% being less than about 30 minutes, and the dynamic water load for said pathway being not less than about 0.6 lb./hr. ft.$^2$.

8. The method of claim 1 wherein said discrete pieces are not larger than about 4 mesh, and the time required to dry said material to a moisture content less than about 4% is less than about 90 minutes.

9. A continuous method of drying a frozen, water-laden, heat-sensitive material in the form of discrete individual pieces having sizes smaller than about 4 mesh which comprises advancing the frozen material along a pathway in an evacuated substantially air-free system having a pressure below about 300 microns in proximity to a cryoplate condenser while supplying radiant energy to said particles to cause sublimation of the ice crystals contained therein to water vapor; at least about 80% of said radiant energy having a wavelength longer than about 2.5 microns and at least about 50% of the area of said pathway being cooled to a temperature within the range from about 20° F. to about −35° F.; flowing said water vapor to said cryoplate condenser, the flow path through which said water vapor flows to said condenser being such that the maximum flow velocity of the flowing vapor lies within the range from about 3% to about 20% of the arithmetic average molecular velocity of the vapor at the conditions which exist in said flow path; condensing and freezing said water vapor on said cryoplate condenser; and periodically disengaging the accumulated ice from said cryoplate condenser and removing said ice from said evacuated system; the material being advanced along said pathway in a manner so that the individual pieces present changing surfaces with the absorption of said radiant energy; the average dynamic water load for said pathway being at least about 0.4 lb./hr. ft.$^2$.

10. Apparatus for drying frozen, moisture-laden materials in the form of discrete pieces comprising a housing, means for removing non-condensible gases from the housing, a pathway for particles within the housing, means for moving and agitating said pieces along the pathway, a cryoplate adjacent an edge of the pathway, means for supplying a refrigerating medium to the cryoplate, means for cooling the pathway, means for supplying radiant energy to particles on the pathway, and means for regulating the rate of input of frozen material so that the evolved vapor travels with a flow velocity within the range of about 3% to 20% of the arithmetical average molecular velocity.

11. Apparatus for drying frozen, moisture-laden materials in the form of discrete pieces comprising a housing, means for removing non-condensible gases from the housing, a pathway for particles within the housing, means for moving and agitating said pieces along the pathway, a cryoplate adjacent an edge of the pathway, means for supplying a refrigerating medium to the cryoplate, means for cooling the pathway, means for supplying radiant energy to particles on the pathway, means for deicing the system, means for controlling the relative rates at which energy is supplied to different points along said pathway, and means for regulating the rate of input of frozen material so that the evolved vapor travels with a flow velocity within the range of about 3% to 20% of the arithmetical average molecular velocity.

12. The apparatus of claim 11 wherein said means for supplying radiant energy comprises a radiator emitting radiant energy at least about 50% of which has a wavelength longer than about 2.5 microns.

References Cited by the Examiner

UNITED STATES PATENTS

| | | | |
|---|---|---|---|
| 693,455 | 2/1902 | Stanley | 34—164 |
| 1,026,971 | 5/1912 | Bullard | 99—71 |
| 1,093,962 | 4/1914 | Allison | 99—71 |
| 2,406,682 | 8/1946 | Hayes | 34—5 |
| 2,483,254 | 9/1949 | Almy | 34—5 |
| 2,495,535 | 1/1950 | Morrison | 34—76 |
| 2,533,125 | 12/1950 | Levinson | 34—5 |
| 2,534,714 | 12/1950 | Hoffman | 34—5 |
| 2,535,109 | 12/1950 | Wigton | 34—203 |
| 2,552,360 | 5/1951 | Zichis | 241—23 |
| 2,620,573 | 12/1952 | McMahon | 34—5 |
| 2,668,364 | 2/1954 | Colton | 34—5 |
| 2,731,734 | 1/1956 | Bancroft | 34—76 |
| 2,751,687 | 6/1956 | Colton | 34—5 |
| 2,805,841 | 9/1957 | Kyle | 165—92 |
| 2,853,796 | 9/1958 | Sanders | 34—5 |
| 3,088,222 | 5/1963 | Mace | 34—92 |

FOREIGN PATENTS

| | | |
|---|---|---|
| 948,517 | 2/1964 | Great Britain. |
| 313,992 | 7/1956 | Switzerland. |

WILLIAM J. WYE, *Primary Examiner.*

A. LOUIS MONACELL, *Examiner.*

M. W. GREEN, *Assistant Examiner.*